Dec. 21, 1954 P. FORMENTI 2,697,453
PROFILE METAL ELEMENT MADE OF A NUMBER OF WELDED
COMPONENT PARTS, FOR FRAMES OF HEDDLE SHAFTS
Filed Sept. 9, 1950
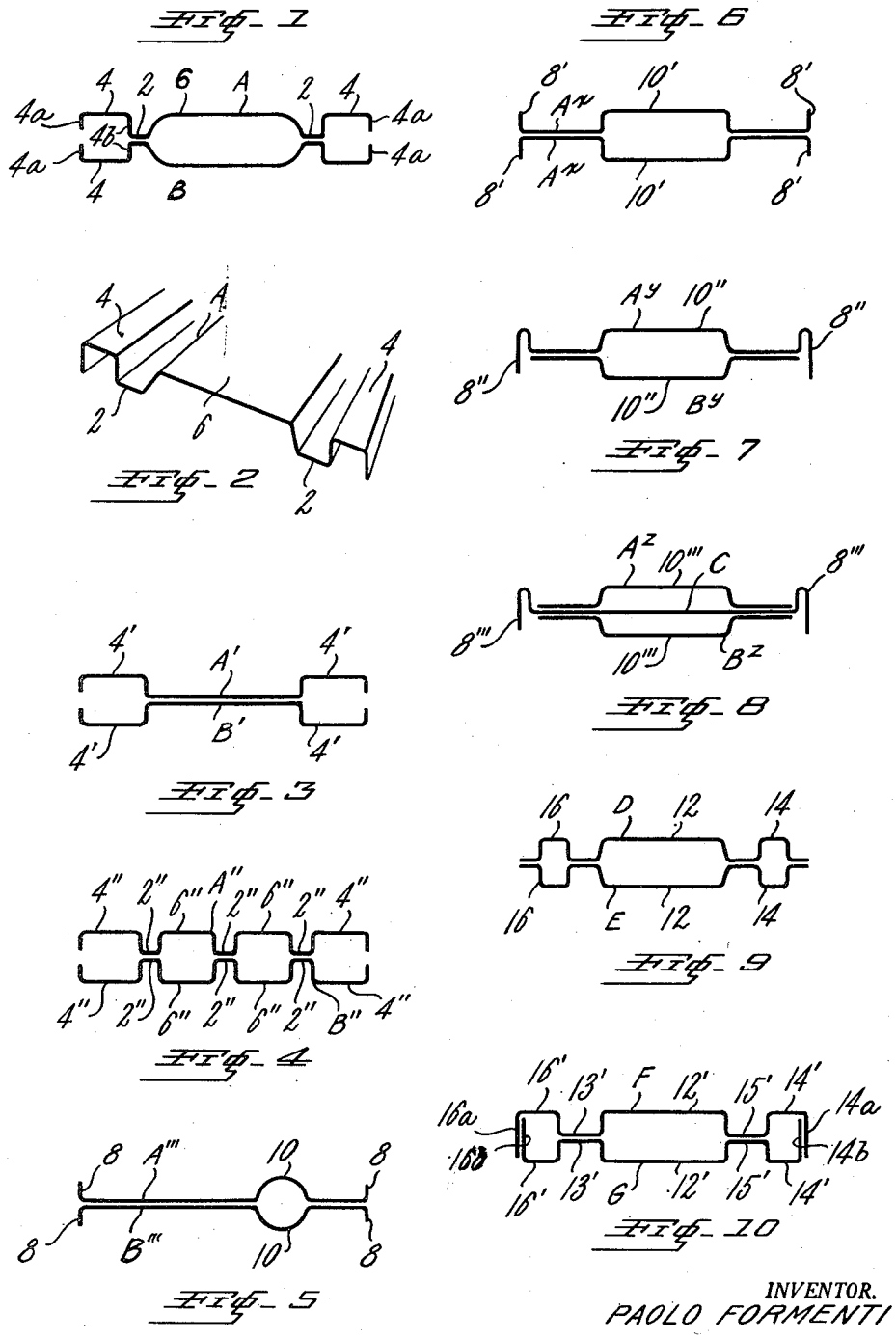
INVENTOR.
PAOLO FORMENTI

United States Patent Office 2,697,453
Patented Dec. 21, 1954

2,697,453

PROFILE METAL ELEMENT MADE OF A NUMBER OF WELDED COMPONENT PARTS, FOR FRAMES OF HEDDLE SHAFTS

Paolo Formenti, Carate Brianza, Italy

Application September 9, 1950, Serial No. 183,942

Claims priority, application Italy April 29, 1950

4 Claims. (Cl. 139—91)

This invention relates to a profile metal element made of a number of welded component parts, for use in connection with frames of heddle-shafts.

The present invention is substantially characterized in that it contemplates the employment of at least two profile component parts, connected by welding along a generatrix.

It is one of the main objects of the invention to provide means contributing to a very sturdy and durable heddle frame structure which may be readily assembled.

Still another object of the invention is to provide means affording ready centering of the component parts of a heddle frame for assembling purposes.

The above and other objects of the invention will become further apparent from the following detailed description, reference being had to the accompanying drawing showing several embodiments of the invention and in which Fig. 1 shows a cross section of a preferred embodiment of the invention.

Fig. 2 is a perspective view of one of the component parts or pieces of which the heddle frame element consists.

Figs. 3 to 10, inclusive, show cross sections of further embodiments of the invention.

Referring now to Figs. 1 and 2, the profile element is composed of two symmetrical metal components parts A and B connected together by welding along the respective contact areas designated by numerals 2.

Each of the aforesaid metal component parts may be made from stamped or drawn or rolled plate stock or the like, and comprises two intermediate plain or straight sections 2, along which welding is performed, two deep-drawn C-shaped end sections 4 having end legs 4a, 4b, and a middle section 6, which is also C- or substantially U-shaped, designed to form a median box which confers the required strength and stiffness to the finished profiled element. The opposed ends 4a form longitudinal inner guides for the sliding hooks by which the heddle shafts are supported and for the anchoring means to heddle guides.

In the illustrated example, the two component parts A and B of the finished element are exactly identical and of equal dimensions, whereby the equipment and machining operations required for the manufacturing of the profile element are remarkably simplified; however, it will be understood that the two component parts might show a different shape to obtain other required operational and strength characteristics.

The profile element herein contemplated is symmetrical in shape even along the middle plane normal to longitudinal axis of the section (i. e. the axis along which the two component parts are joined), whereby the profile element can be assembled both in one direction and in the opposite one, whereby suspension and anchoring means can be provided that are arranged into the profile element and guides.

The profile element shown by Fig. 3 is similar to that aforedescribed (and the corresponding parts are marked by same reference numerals provided with primes) except for the fact that both parts A and B have a plane middle section, i. e. are not provided with the C-recessed sections by which the stiffening box is formed. The welds for the joining of the two component parts A', B' are provided along the plane middle section.

The profile element shown in Fig. 4 is also similar to that of Figs. 1 and 2 (the corresponding reference numerals are provided with double primes) except for the fact that there are two middle C-shaped zones 6", and thus a double longitudinal stiffening box is formed. The weld beads are provided in corresponding plane sections 2" that are interposed between the various C-shaped sections A", B".

The element shown in Fig. 5 consists of two symmetrical component parts A''' and B''', which have outer ends 8 bent outwardly through 90° so as to form two longitudinal T-guides. The stiffening of the profile element is obtained by means of the semicircular bents 10 which form a tubular box.

The profile element with component parts $A^x$, $B^x$ shown in Fig. 6 is again similar to those previously described except for the fact that the middle stiffening box 10' has a rectangular or like shape and terminates in legs 8'.

Fig. 7 illustrates a profile element which consists of two component parts $A^y$ and $B^y$, similar to those of which the profile element of Fig. 6 is composed. However the T-end-guides 8" are obtained by forming the outer edges of only one element (i. e. that marked with $A^y$), while the other component part $B^y$ has plane edges.

In the element illustrated in Fig. 8, the two elements $A^z$ and $B^z$, by which the middle stiffening box 10''' is formed, are again present. However, the elements $A^z$ and $B^z$ have plane edges, and the T-guides are obtained by bending the edges 8''' of a third plane component part C, interposed between the parts A and B and joined thereto by welding.

The two component parts D and E shown in Fig. 9, have three C-shaped middle sections 12, 14 and 16, whereby three longitudinal stiffening boxes are obtained. The sections between the boxes and the end sections are plane and are joined to each other by welding. The outer boxes 14 and 16 are designed to serve as outer guides for the heddle shaft supporting hooks and for the anchoring means to heddle guides.

The embodiment form shown in Fig. 10 is similar to those previously described except for the outer edges or rims of component parts F and G, which are bent inwardly through 90°, being thereby superimposed one to another. The component parts or complementary elements F and G are each provided with U-shaped and stiffening sections 14', 16' and an intermediate stiffening section 12' therebetween, and two abutting sections 13', 15' located between said intermediate and end stiffening sections. Obviously, each end stiffening section is provided with outermost rims or legs 14a, 14b and 16a, 16b which embrace each other when said elements are assembled whereby said outermost legs of said end stiffening sections overlap each other and are directed substantially perpendicular to the longitudinal axis of the assembled elements.

While preferred embodiments of the invention have been shown and herein described, it will be understood that the same are capable of modifications without departure from the general scope and spirit of the invention as defined in the claims.

I claim:

1. In a heddle frame: a pair of substantially identically shaped elements secured together in confronting and parallel relation with respect to each other, said elements being provided with substantially U-shaped end sections each terminating in an end leg, said legs being spaced and parallel when said elements are in assembled position and extending in planes normal to the longitudinal axis of symmetry of said elements, said end sections defining plane bearing surfaces for respective heddle parts, said elements being further provided with confronting intermediate concave sections forming longitudinally extending first stiffening means, said end sections forming second stiffening means cooperating with said first stiffening means to thereby prevent lateral displacement of said elements with respect to each other and to afford centering of said elements.

2. In a heddle frame; a support for parts of said frame, said support comprising two complementary elements secured together and each provided with U-shaped end stiffening sections and an intermediate stiffening section therebetween, and two abutting sections, said abutting sections of each element being located between said intermediate stiffening sections and said end stiffening sections, each end stiffening section being provided with outermost legs embracing each other when said elements are assembled, whereby said outermost legs of said end stiffening sections are arranged in overlapping position with respect to each other and are directed substantially perpendicular to the longitudinal axis of symmetry of said elements.

3. In a heddle frame according to claim 2, wherein said elements are unequal in length, so that one of said elements is received within the other of said elements, to thereby prevent lateral displacement and afford centering of said elements with respect to each other for assembling purposes.

4. In a heddle frame according to claim 2, wherein each of said elements is provided with inner parts extending substantially in alignment with each other when assembled and substantially perpendicular to said longitudinal axis.

References Cited in the file of this patent

UNITED STATES PATENTS

| Number | Name | Date |
|---|---|---|
| 426,559 | Dithridge | Apr. 29, 1890 |
| 631,655 | Noble | Aug. 22, 1899 |
| 1,434,189 | Bennett | Oct. 31, 1922 |
| 1,644,940 | Moyer | Oct. 11, 1927 |
| 1,866,908 | Robertson | July 12, 1932 |
| 2,418,929 | Glassbrook | Apr. 15, 1947 |
| 2,508,032 | Kennedy | May 16, 1950 |

FOREIGN PATENTS

| Number | Country | Date |
|---|---|---|
| 101,736 | Sweden | June 3, 1941 |
| 155,094 | Switzerland | Nov. 16, 1932 |
| 271,892 | Switzerland | Feb. 16, 1951 |
| 733,443 | France | July 11, 1932 |
| 958,059 | France | Sept. 5, 1949 |